(12) United States Patent
Carati et al.

(10) Patent No.: US 10,005,071 B2
(45) Date of Patent: Jun. 26, 2018

(54) MIXED OXIDES OF TRANSITION METALS, HYDROTREATMENT CATALYSTS OBTAINED THEREFROM AND PREPARATION PROCESS

(71) Applicant: ENI S.P.A., Rome (IT)

(72) Inventors: Angela Carati, San Giuliano Milanese (IT); Maria Federica Gagliardi, Castellanza (IT); Marco Massimo Ferrari, Milan (IT); Stefano Zanardi, Trecate (IT); Marcello Marella, Venice (IT); Michele Tomaselli, Venice (IT)

(73) Assignee: ENI S.P.A. (IT)

( * ) Notice: Subject to any disclaimer, the term of this patent is extended or adjusted under 35 U.S.C. 154(b) by 0 days. days.

(21) Appl. No.: 15/357,341

(22) Filed: Nov. 21, 2016

(65) Prior Publication Data
US 2017/0136446 A1    May 18, 2017

Related U.S. Application Data

(62) Division of application No. 14/007,913, filed as application No. PCT/EP2012/055116 on Mar. 22, 2012, now Pat. No. 9,522,394.

(30) Foreign Application Priority Data

Mar. 30, 2011  (IT) ............................. MI2011A0510

(51) Int. Cl.
*B01J 35/00*    (2006.01)
*B01J 23/888*   (2006.01)
(Continued)

(52) U.S. Cl.
CPC ......... *B01J 23/8885* (2013.01); *B01J 23/002* (2013.01); *B01J 35/002* (2013.01);
(Continued)

(58) Field of Classification Search
CPC .................................................. B01J 23/8885
See application file for complete search history.

(56) References Cited

U.S. PATENT DOCUMENTS 6,812,366 B2    11/2004  Lin
6,921,836 B1 *  7/2005   Hibst ................... B01J 23/002
                                                             502/312
(Continued)

FOREIGN PATENT DOCUMENTS

EP    1055455 A2   11/2000
RU    2338591 C2   11/2008
(Continued)

*Primary Examiner* — Melvin C. Mayes
*Assistant Examiner* — Stefanie J Cohen
(74) *Attorney, Agent, or Firm* — Tarolli, Sundheim, Covell & Tummino LLP

(57) ABSTRACT

New sulfide metal catalysts are described, containing Ni, Mo and W, an element Z selected from Si, Al and mixtures thereof, and possibly an organic residue, obtained by sulfidation of mixed oxide precursors, also new, characterized in that they comprise an amorphous phase and a wolframite iso structural crystalline phase, the crystallinity degree of said mixed oxides being higher than 0 and lower than 100%, preferably higher than 0 and lower than 70%. The catalysts of the invention are useful as hydrotreatment catalysts, and in particular as hydrodesulfurization, hydrodenitrogenation and/or hydrodearomatization catalysts.

8 Claims, 6 Drawing Sheets

(51) Int. Cl.
  *B01J 23/00*  (2006.01)
  *B01J 37/00*  (2006.01)
  *B01J 37/10*  (2006.01)
  *B01J 37/04*  (2006.01)
  *C10G 45/08*  (2006.01)
  *C10G 45/50*  (2006.01)

(52) U.S. Cl.
  CPC ............ *B01J 37/0009* (2013.01); *B01J 37/04* (2013.01); *B01J 37/10* (2013.01); *C10G 45/08* (2013.01); *C10G 45/50* (2013.01); *B01J 2523/00* (2013.01)

(56) References Cited

U.S. PATENT DOCUMENTS

| | | |
|---|---|---|
| 7,297,321 B2 * | 11/2007 | Shpeizer .................. B01J 23/26 423/263 |
| 7,544,285 B2 | 6/2009 | Domokos et al. |
| 2004/0092769 A1 | 5/2004 | Hiromi et al. |
| 2004/0182749 A1 | 9/2004 | Domokos et al. |
| 2011/0166384 A1 | 7/2011 | Michio et al. |

FOREIGN PATENT DOCUMENTS

| | | |
|---|---|---|
| WO | 2004/073859 A1 | 9/2004 |
| WO | 2009/058783 A1 | 5/2009 |
| WO | 2010/038676 A1 | 4/2010 |
| WO | 2011/039595 A2 | 4/2011 |

* cited by examiner

MIXED OXIDES OF TRANSITION METALS, HYDROTREATMENT CATALYSTS OBTAINED THEREFROM AND PREPARATION PROCESS New sulfide metal catalysts are described, containing Ni, Mo, W, an element Z selected from Si, Al and mixtures thereof, obtained by the sulfidation of suitable precursors, wherein said precursors are new and are mixed oxides containing Ni, Mo, W, at least one element selected from Si, Al and mixtures thereof, optionally containing an organic component selected from a suitable nitrogenated compound N, an organic residue R containing carbon and nitrogen, and a mixture of the residue R and nitrogenated compound N.

Said mixed oxides are characterized in that they comprise an amorphous phase and a wolframite isostructural crystalline phase, the crystallinity degree of these mixed oxides being higher than 0 and lower than 100%, preferably higher than 0 and lower than 70%.

Suitable preparation methods of these precursors are also described. The catalysts obtained by the sulfidation of these precursors can be used as hydrotreatment catalysts, in particular as hydrodesulfurization, hydrodenitrogenation and/or hydrodearomatization catalysts.

Figure 1A:
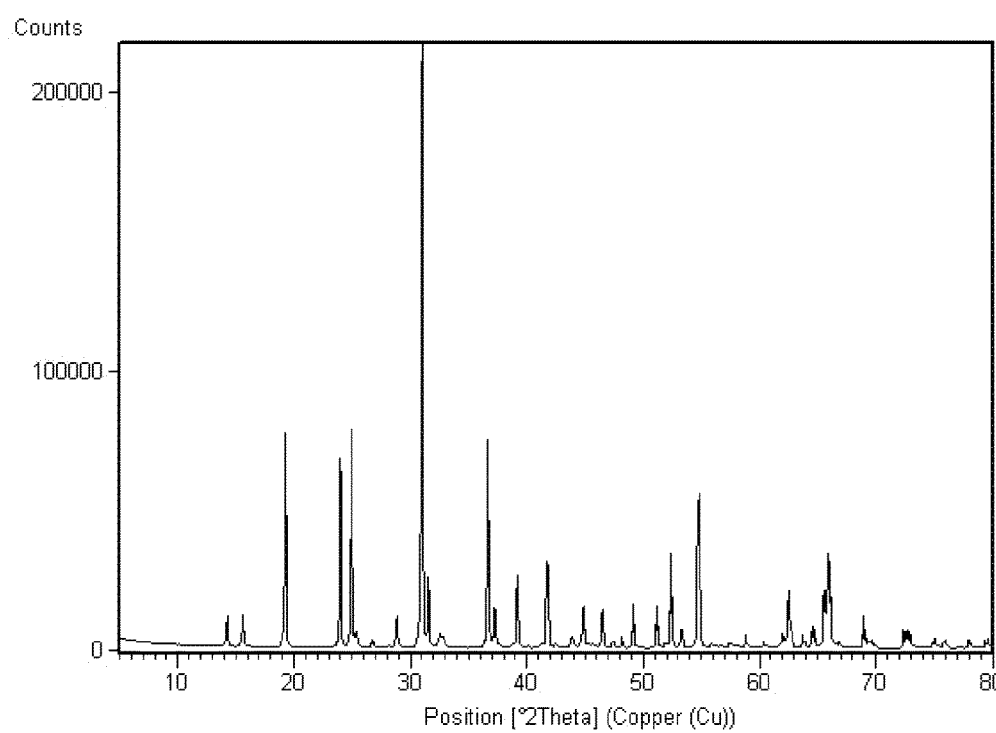
FIGS. 1A-G illustrate the XRD diffraction patterns of the samples of (A) Example 2, (B) Example 3, (C) Example 4, (D) Example 5, (E) Example 6, (F) Example 7, and (G) Example 8.

Since the beginning of the last century, it has been known that transition metals are converted to catalytic materials of the TMS ("Transition Metal Sulfide") type, in the presence of heavy oil fractions rich in sulfur. The work of M. Pier, Z. Elektrochem., 35 (1949), 291 is particularly important after which TMS catalysts such as $MoS_2$ and $WS_2$, became the basis of modern catalysts supported on alumina, with Co or Ni as promoters.

TMS of the second or third transition series, such as $RuS_2$ and $Rh_2S_3$, have proved to be very active and stable catalysts in hydrotreatment processes. As they are based on precious metals, however, their application is not widely diffused in industry. In all refining processes in which unitary hydrotreatment operations must be effected, whether they be hydrogenation or the removal of sulfur and nitrogen, the preferred catalysts are therefore based on Mo and W. Furthermore, both Co and Ni, or both, are used for promoting the activity of the catalyst. The promoter allows to obtain an increase in the catalytic activity which depends on the preparation details, the type of material and other factors, but which can reach a factor 10-12 times higher with respect to that of a catalyst without a promoter (H. Topsoe, B. S. Clausen, F. E. Massoth, in *Catalysis, Science and Technology*, vol. 11, J. R. Anderson and M. Boudard Eds., (Springer-Verlag, Berlin 1996)).

This phenomenon is called synergic effect and implies that promoter and base metal act together.

Due to increasingly strict regulations on gaseous emissions, however, resort must be made to even more active catalysts. In particular, in diesel fuel for motor vehicles, the recent European regulation requires a sulfur content <10 ppm. In order to be able to pass below these levels, catalysts must be found that are capable of decomposing compounds which are particularly difficult to treat, such as sterically hindered dibenzothiophenes. In addition, the catalyst must also be active with respect to compounds containing other heteroatoms, nitrogen in particular, which tend to deactivate its functionality with respect to compounds containing sulfur.

A recent development relates to the application of catalysts which comprise a non-noble metal of Group VIII and two metals of Group VIB. Catalysts of this type and the their preparation are described, for example, in patents JP 09000929, U.S. Pat. No. 4,596,785, U.S. Pat. No. 4,820,677, U.S. Pat. No. 6,299,760, U.S. Pat. No. 6,635,599, US 2007/0286781, EP 1941944. In particular, as far as the preparations are concerned, JP 09000929 describes a process for impregnation of an inorganic carrier with Co (or Ni), Mo and W. U.S. Pat. No. 4,596,785 and U.S. Pat. No. 4,820,677 describe co-precipitation techniques of the relative sulfides, which therefore require process phases in inert atmospheres. U.S. Pat. No. 6,299,760 and U.S. Pat. No. 6,635,599 describe co-precipitation methods with the use of complexing agents, from aqueous solutions heated to around 90° C. US 2007/0286781 also describes a preparation process for materials based on transition metals, using co-precipitation techniques. In patent EP 1941944, co-precipitation techniques are coupled with heating phases to relatively high temperatures.

None of these processes, however, allows an accurate control on the stoichiometry of the final material.

EP 340868 describes a sol-gel process for the preparation of a micro-mesoporous silica and alumina gel, amorphous to X-rays, having a $SiO_2/Al_2O_3$ molar ratio within the range of 30 to 500, a surface area within the range of 500 to 1,000 $m^2/g$ and a pore volume ranging from 0.3-0.6 ml/g.

U.S. Pat. No. 5,914,398 describes a sol-gel process for the preparation of a micro-mesoporous silico-alumina.

In patent EP 0972568, a sol-gel process is described for obtaining a catalyst containing molybdenum with a specific surface area ranging from 20 to 400 $m^2/g$ and a Mo/Si molar ratio >0.2, exemplified up to 4.5. This is a specific catalyst for the isomerization of n-paraffins.

Patent application MI2009A001680 describes a particular calibrated sol-gel synthesis whereby mixed oxides containing suitable transition metals (TM) of groups VIII and VIB, and containing silicon and/or aluminium, can be prepared, even in a high MT/Si or MT/Al molar ratio, at the same time maintaining high values of the specific surface area and total pore volume. The preparation of these mixed oxides passes through the synthesis of precursors containing a gelifying agent. These precursors containing a gelifying agent and the mixed oxides obtained therefrom, possibly after forming, are transformed into the relative sulfides. The mixed oxides described in MI2009A001680 can be formed without a binder and have the general formula:

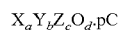

$$X_aY_bZ_cO_d \cdot pC$$

wherein X is selected from Ni, Co and mixtures thereof,
Y is selected from Mo, W and mixtures thereof,
Z selected from Si and Al and mixtures thereof,
O is oxygen
C is selected from:
  a nitrogenated compound N,
    an organic residue deriving from the nitrogenated compound N by partial calcination, wherein said nitrogenated compound N is selected from:
a) a tetra-alkylammonium hydroxide having formula (I):

wherein the groups $R^I$, $R^{II}$, $R^{III}$ and $R^{IV}$, equal to or different from each other, are aliphatic groups containing from 1 to 7 carbon atoms,
b) an amine having formula (II)

wherein
$R^1$ is a linear, branched or cyclic alkyl, containing from 4 to 12 carbon atoms, and $R^2$ and $R^3$, equal to or different from each other, are selected from H and linear, branched or cyclic alkyl, containing from 4 to 12 carbon atoms, said alkyl can be equal to or different from $R^1$,
a, b, c, d are the number of moles of the elements X, Y, Z, O respectively,
p is the weight percentage of C with respect to the total weight of the compound having formula (A),
a, b, c, d are higher than 0,
a/b is higher than or equal to 0.3 and lower than or equal to 2,
(a+b)/c is higher than or equal to 0.3 and lower than or equal to 10, and preferably ranges from 0.8 to 10

$$d=(2a+6b+Hc)/2$$

wherein H=4 when Z=Si
H=3 when Z=Al
and p is higher than or equal to 0 and lower than or equal to 40%.

US 2007/0084754 describes a bulk catalyst comprising nickel and tungsten oxides as main components. A second metal of group VIB can be present in the synthesis suspension, in a quantity lower than 10% in moles with respect to the total quantity of metals of group VIB. The bulk catalyst obtained has a metastable hexagonal structure and an X-ray diffraction pattern with a single reflection between 58 and 65° (diffraction angle 2θ) and main reflections between 32 and 36° and between 50 and 55°. The bulk catalyst treated at high temperatures gives an orthorhombic crystalline phase $NiWO_4$ identified in the databank of powder diffraction patterns as nickel tungstate oxide (JCPDS-ICDD PDF card 15-0755 or 72-1189 or 72-0480).

US 2009/0139904 relates to a bulk catalyst comprising nickel and molybdenum oxides as main components. A second metal of group VIB can be present in the synthesis suspension, in a quantity of less than 10% in moles with respect to the total quantity of metals of group VIB. The bulk catalyst obtained has a metastable hexagonal structure and an X-ray diffraction pattern with reflections between 33 and 35° (diffraction angle 2θ) and 58-61°. The bulk catalyst treated at high temperatures gives crystalline phases hypothetically identified as α-NiMoO4 and β-NiMoO4.

Salamanca et al., Phys. Chem. Chem. Phys. 2009, 11, 9583-9591 describes the hydrothermal synthesis of compounds with a wolframite-type structure having a trimetallic composition among which $NiMo_{0.5}W_{0.5}O_4$. The synthesis is effected by hydrothermal treatment at 473 K and leads to the formation of a completely crystalline material.

L. Gonzàles-Cortes et al., Journal of Molecular Catalysis A: Chemical 238 (2005) 127-134, describes the synthesis of a family of materials with a wolframite isostructural CoNiW composition. These materials are transformed into carbides and used as HDN catalysts.

Particular mixed oxides have now been found, containing a wolframite isostructural crystalline phase, capable of controlled crystallinity, obtained by means of a specific preparation process, which, possibly after forming, generate, by sulfidation, catalysts which are particularly active in hydrotreatment processes, and in particular in hydrodesulfurization, hydrodenitrogenation and/or hydrodearomatization processes. These catalysts are capable of reducing the content of aromatic compounds, by hydrodearomatization, and particularly aromatic polynuclear (PNA) compounds, present in the cut that is treated: the hydrodearomatization takes place contemporaneously with the hydrodesulfurization and hydrodenitrogenation if sulfur and nitrogen impurities are also present in the cut.

A first object of the present invention therefore relates to mixed oxides, indicated with the abbreviation OM, containing Ni, Mo, W, at least one element selected from Si, Al and mixtures thereof, and possibly containing an organic component C selected from a nitrogenated compound N, an organic residue R containing carbon and nitrogen, and a mixture of the residue R and nitrogenated compound N, characterized in that they comprise an amorphous phase and a wolframite isostructural monoclinic crystalline phase, the crystallinity degree of said mixed oxides being higher than 0 and lower than 100%, preferably higher than or equal to 3% and lower than 100%.

Wolframite is a mineral consisting of mixed iron and manganese tungstate, having a monoclinic symmetry. An isostructural crystalline phase refers to a phase having the same type of geometric crystalline structure but different chemical compositions.

In particular, an object of the present invention relates to mixed oxides comprising an amorphous phase and a wolframite isostructural crystalline phase, having a crystallinity degree higher than 0 and lower than 100%, having formula (I):

possibly formed without a binder,
wherein Y is a mixture of Mo and W in a molar ratio Mo/W greater than 0.1 and less than 10,
Z is selected from Si, Al and mixtures thereof,
O is oxygen,
C is an organic component selected from a nitrogenated compound N, an organic residue R containing carbon and nitrogen, a mixture of the residue R and nitrogenated compound N,
said nitrogenated compound N being an amine having formula (A)

wherein
$R^1$ is a linear, branched or cyclic alkyl, containing from 4 to 12 carbon atoms, and
$R^2$ and $R^3$, equal to or different from each other, are selected from H and linear, branched or cyclic alkyl, containing from 4 to 12 carbon atoms, said alkyl possibly being equal to or different from $R^1$,
a, c, d are the number of moles of Ni, Z, O, respectively,
b is the sum of the moles of W and Mo
p is the weight percentage of C with respect to the total weight of the compound having formula (I),
a, b, c, d are greater than 0
a/b is greater than or equal to 0.6 and lower than or equal to 1.5, (a+b)/c is greater than or equal to 0.3 and lower than or equal to 10, and preferably ranges from 0.8 to 10

$$d=(2a+6b+Hc)/2$$

wherein H=4 when Z=Si
H=3 when Z=Al
and p is greater than or equal to 0 and lower than or equal to 40%.

Preferably, the crystallinity degree of the mixed oxides of the present invention is greater than or equal to 3% and lower than 100%, even more preferably greater than or equal to 6% and lower than or equal to 90%. A particularly preferred aspect is that the crystallinity degree of the mixed oxides of the present invention is greater than or equal to 10% and lower than or equal to 90%.

The crystallinity degree of a mixed oxide of the present invention is given by the ratio $$(Ix/Istd)*100$$

wherein:
Ix is the integrated intensity of the peak positioned at 30.90°±0.5° of 2-theta selected in the X-ray diffraction pattern of the mixed oxide containing nickel, molybdenum and tungsten of the present invention;
Istd is the integrated intensity of the peak positioned at 30.90°±0.5° of 2-theta selected in the X-ray diffraction pattern of the same mixed oxide containing nickel, molybdenum and tungsten, subjected to thermal treatment at 900° C.

The mixed oxides containing nickel, molybdenum and tungsten that are thermally treated at 900° C. are completely crystalline and wolframite isostructural: said oxides having a crystallinity of 100% are then used as reference for calculating the crystallinity of the mixed oxides of the present invention. Said completely crystalline oxides have the X-ray diffraction pattern indicated in FIG. 1a.

In the mixed oxides of the present invention, with a controlled crystallinity degree, coexist therefore an amorphous phase and a wolframite isostructural crystalline phase, and the appropriate calibration of the entity of the crystalline phase allows to obtain materials that after sulfidation provide particularly high catalytic performances in hydrotreatment, and with a wide range, comprising, in addition to hydrodesulfurization and hydro-denitrogenation, also hydrodearomatization and reduction in the content of polynuclear aromatic compounds (PNA) in the hydrocarbon mixtures treated.

The organic residue R contained in the mixed oxides of the present invention, comprising carbon and nitrogen, is the residue obtained from the nitrogenated compound N when the mixed oxide containing said compound N is subjected to thermal treatment.

According to a preferred aspect, in the mixed oxides having formula (I), Y is a mixture of Mo and W in a molar ratio Mo/W ranging from 0.2 to 9.

According to a preferred aspect, in the mixed oxides having formula (I), a/b ranges from 0.80 to 1.4, preferably from 0.95 to 1.4, even more preferably from 0.98 to 1.3.

When the mixed oxides OM of the present invention contain an organic compound C selected from a nitrogenated compound N, an organic residue R containing carbon and nitrogen, or a mixture of the residue R and nitrogenated compound N, said component is preferably in a quantity greater than 0 and less than or equal to 25% by weight.

Compounds having formula (I) formed without a binder refer to compounds having formula (I) in the form suitable for being used industrially in a reactor and without adding a binder, i.e. without the use of a binder in the forming process. All forming techniques without binders can be used for the purpose. Particular new forming techniques are described hereunder.

The mixed oxides OM of the present invention are transformed into the relative sulfides, wherein said sulfides are new and active as hydrotreatment catalysts. In particular, the compounds having formula (I) are transformed into the relative sulfides, active as hydrotreatment catalysts, by means of sulfidation: the sulfide metal compounds, called (I)S, containing Ni, Mo and W, an element Z selected from Si, Al, mixtures thereof, and possibly an organic residue R, obtained by sulfidation of the precursor compounds having formula (I), possibly formed without a binder, or precursors having formula (I) in the shaped form with a binder, are, in turn, new and represent a further object of the present invention.

Hydrotreatment refers to a process in which a hydrocarbon feed is converted, in the presence of hydrogen, at a high temperature and pressure. During the hydrotreatment, various reactions can take place, for example, hydrogenation, isomerization, hydrodesulfurization, hydrodenitrogenation and hydrodearomatization, depending on the catalytic system and operating conditions used. The sulfide catalysts of the present invention, in particular those obtained by sulfidation of the precursors having formula (I), are active in hydrotreatment and particularly selective in hydrodesulfurization and hydrodenitrogenation reactions, and in the hydrodearomatization of aromatic compounds, especially polynuclear aromatic compounds.

A particular object of the present invention relates to new mixed oxides which can be used, after sulfidation, as hydrotreatment catalysts, comprising an amorphous phase and a wolframite isostructural crystalline phase having a crystallinity degree greater than 70% and lower than 100%, having a general molar formula (I1):

$$Ni_aY_bZ_cO_d \quad \text{(I1)}$$

possibly formed without a binder, wherein Y is a mixture of Mo and W in which the molar ratio Mo/W is greater than 0.1 and less than 10,
Z is selected from Si, Al and mixtures thereof,
O is oxygen,
a, c, d are the number of moles of Ni, Z, O, respectively, and are greater than 0
b is the sum of the moles of W and Mo, and is greater than 0
a/b is greater than or equal to 0.6 and lower than or equal to 1.5,
(a+b)/c is greater than or equal to 0.3 and lower than or equal to 10, and preferably ranges from 0.8 to 10, $$d=(2a+6b+Hc)/2$$

wherein H=4 when Z=Si
H=3 when Z=Al.

According to a preferred aspect, in the mixed oxides having formula (I1), Y is a mixture of Mo and W in a molar ratio Mo/W ranging from 0.2 to 9.

According to a preferred aspect, in the mixed oxides having formula (I1), a/b ranges from 0.80 to 1.4, preferably from 0.95 to 1.4, and even more preferably from 0.98 to 1.3.

Said oxides (I1) preferably have a crystallinity degree greater than 70% and lower than or equal to 90%.

As previously indicated, the compounds having formula (I1) are transformed into the relative sulfides by means of sulfidation: the sulfide metal compounds, indicated as (I1)S, containing Ni, Mo and W, an element Z selected from Si, Al and mixtures thereof, obtained by sulfidation of the precursor compounds having formula (I1), possibly formed without a binder, or compounds having formula (I1) in the shaped form with a binder, are, in turn, new and represent a further object of the present invention. These particular sulfide compounds are in turn active as hydrotreatment catalysts, and particularly selective in hydrodesulfurization and hydrodenitrogenation reactions, and in the hydrodearomatization of aromatic compounds, especially polynuclear aromatic compounds.

Another particular object of the present invention relates to new mixed oxides, useful, after sulfidation, as hydrotreatment catalysts, comprising an amorphous phase and a wolframite isostructural crystalline phase having a crystallinity degree greater than 0 and lower than or equal to 70%, having general formula (I2):

$$Ni_a Y_b Z_c O_d \cdot pC \quad (I2)$$

possibly formed without a binder,
wherein Y is a mixture of Mo and W in which the molar ratio Mo/W is greater than 0.1 and less than 10,
Z is selected from Si and Al and mixtures thereof,
O is oxygen,
C is an organic component selected from a nitrogenated compound N, an organic residue R containing carbon and nitrogen, a mixture of the residue R and nitrogenated compound N,
said nitrogenated compound N being an amine having formula (A)

$$R^1 R^2 R^3 N \quad (A)$$

wherein
$R^1$ is a linear, branched or cyclic alkyl, containing from 4 to 12 carbon atoms, and
$R^2$ and $R^3$, equal to or different from each other, are selected from H and linear, branched or cyclic alkyl, containing from 4 to 12 carbon atoms, said alkyl possibly being equal to or different from $R^1$,
a, c, d are the number of moles of Ni, Z, O, respectively,
b is the sum of the moles of W and Mo
p is the weight percentage of C with respect to the total weight of the compound having formula (I2),
a, b, c, d are greater than 0
a/b is greater than or equal to 0.6 and lower than or equal to 1.5,
(a+b)/c is greater than or equal to 0.3 and lower than or equal to 10, and preferably ranges from 0.8 to 10

$$d=(2a+6b+Hc)/2$$

wherein H=4 when Z=Si
H=3 when Z=Al
p is greater than 0 and lower than or equal to 40%.

A particularly preferred aspect is that in said oxides (I2), the crystallinity degree is greater than or equal to 3 and lower than or equal to 70%, more preferably greater than or equal to 3 and lower than or equal to 60%, even more preferably it ranges from 6 to 60%. A particularly preferred aspect is that the crystallinity degree of the mixed oxides having formula (I2) is greater than or equal to 10 and lower than or equal to 50%.

According to a preferred aspect, in the mixed oxides having formula (I2), Y is a mixture of Mo and W in a molar ratio Mo/W ranging from 0.2 to 9.

According to a preferred aspect, in the mixed oxides having formula (I2), a/b varies from 0.80 to 1.4, preferably from 0.95 to 1.4, even more preferably from 0.98 to 1.3.

Said oxides (I2) are preferably mesoporous, have a surface area, determined after thermal treatment at 400° C., higher than or equal to 90 m²/g and a pore volume higher than or equal to 0.18 ml/g. In accordance with the IUPAC terminology "Manual of Symbols and Terminology" (1972), Appendix 2, Part I Coll. Surface Chem. Pure Appl. Chem., Vol. 31, page 578, wherein micropores are defined as pores having a diameter smaller than 2 nm, mesopores are defined as pores having a diameter ranging from 2 to 50 nm, macropores are those having a diameter larger than 50 nm, the mixed oxides of the present invention having formula (I2) are mesoporous, and are characterized by an irreversible isotherm of type IV. The average pore diameter is preferably within the range of 3 to 18 nm.

The compounds having formula (I2), preferably with a crystallinity degree greater than 0 and lower than or equal to 70%, are also transformed into the relative sulfides by means of sulfidation: the sulfide metal compounds, indicated as (I2)S, containing Ni, Mo, W, an element Z selected from Si, Al and mixtures thereof, possibly an organic residue, obtained by sulfidation of the precursor compounds having formula (I2), possibly formed without a binder, or compounds having formula (I2) in the shaped form with a binder, are in turn new and are a further object of the present invention.

These particular sulfide compounds are active as hydrotreatment catalysts, and particularly selective in hydrodesulfurization and hydrodenitrogenation reactions, and in the hydrodearomatization of aromatic compounds, especially polynuclear aromatic compounds.

Compounds having formula (I1) and (I2) formed without a binder refer to compounds having formula (I1) and (I2) in a form suitable for being used in a chemical reactor, without the addition of a binder, i.e. without the addition of a binder in the forming process: said forming without the addition of a binder can be effected with any technique known to experts in the field. Particular forming processes are described hereunder and are a further object of the present invention.

According to what is described above, the family of precursors having formula (I) is therefore composed of precursors having formula (I1) and precursors having formula (I2), the latter containing an organic component selected from a nitrogenated compound N having formula (A), an organic residue R containing carbon and nitrogen, or a mixture thereof.

With reference to the mixed oxides OM of the present invention, and in particular the oxides having formula (I) and (I2), a preferred aspect is that the nitrogenated compounds, in particular having formula (A), are n-hexylamine, n-heptylamine or n-octylamine.

For the mixed oxides of the present invention, the powder X-ray diffraction patterns were measured by means of a vertical goniometer equipped with an electronic pulse height analyzer and using CuKα radiation (λ=1.54178 Å): these diffraction patterns show the presence of an amorphous phase and a crystalline phase with a monoclinic symmetry isostructural with wolframite, in which the peak positioned at about 30.90°±0.5° of 2-theta, corresponding to the convolution of the doublet consisting of reflections having indexes 111 and 11-1, typical of a wolframite-type structure, proves to be the strongest peak.

Other crystalline phases can be present in traces.

Table 1 reports the reflections of the XRD pattern typical of the Wolframite structure:

TABLE 1

| N° | 2θ (°) | Intensity |
|---|---|---|
| 1 | 15.6 ± 0.1 | Weak |
| 2 | 19.3 ± 0.2 | Strong |
| 3 | 24.0 ± 0.3 | Strong |
| 4 | 24.9 ± 0.3 | Strong |
| 5 | 30.9 ± 0.5 | Very Strong |
| 6 | 31.5 ± 0.5 | Medium |
| 7 | 36.7 ± 0.5 | Strong |
| 8 | 37.2 ± 0.5 | Weak |
| 9 | 39.2 ± 0.5 | Medium |
| 10 | 41.7 ± 0.6 | Strong |
| 11 | 46.5 ± 0.6 | Weak |
| 12 | 48.1 ± 0.6 | Very Weak |
| 13 | 49.1 ± 0.6 | Weak |
| 14 | 52.3 ± 0.7 | Medium |
| 15 | 54.7 ± 0.7 | Strong |
| 16 | 58.8 ± 0.7 | Very Weak |
| 17 | 62.6 ± 0.7 | Medium |
| 18 | 63.7 ± 0.7 | Weak |
| 19 | 66.0 ± 0.8 | Strong |
| 20 | 68.9 ± 0.8 | Weak |

In the mixed oxides according to the present invention, the resolution and integrated area of the peaks is in relation to the crystallinity degree: in all the mixed oxides of the present invention, and therefore also those with a low crystallinity, for example, lower than 15%, the reflections indicated as very strong or strong in Table 1, indicated in Table 2, can in any case be identified. The mixed oxides according to the present invention therefore have an XRD pattern characterized by the presence of an amorphous phase and a crystalline phase with a monoclinic symmetry isostructural with wolframite whose XRD pattern comprises the reflections indicated in Table 2:

TABLE 2

| N° | 2θ (°) | Intensity |
|---|---|---|
| 1 | 19.3 ± 0.2 | Strong |
| 2 | 24.0 ± 0.3 | Strong |
| 3 | 24.9 ± 0.3 | Strong |
| 4 | 30.9 ± 0.5 | Very Strong |
| 5 | 36.7 ± 0.5 | Strong |
| 6 | 41.7 ± 0.6 | Strong |
| 7 | 54.7 ± 0.7 | Strong |
| 8 | 66.0 ± 0.8 | Strong |

The low crystallinity degree can cause a certain shift of these reflections. The evolution observed with an increase in the crystallinity degree, however, allows attributing without doubts such patterns to materials having a low crystallinity containing a phase isostructural with wolframite. The resolution of the spectrum increases with the increase of the crystallinity degree.

The calculation of the crystallinity degree of the mixed oxides according to the present invention was effected applying the following procedure:

the diffraction peak in the XRD pattern located at about 30.90°±0.5° of 2-theta is selected for the sample considered, corresponding to the convolution of the doublet consisting of reflections having indexes 111 and 11-1, typical of the wolframite-type structure;

the relative crystallinity of the sample is calculated applying the following equation:

$$Crystallinity = (Ix/Istd)*100$$

wherein:

Ix is the integrated intensity of the peak selected in the X-ray diffraction pattern of the sample of mixed oxide containing nickel, molybdenum and tungsten whose relative crystallinity is to be calculated;

Istd is the integrated intensity of the peak selected in the X-ray diffraction pattern of the same sample of mixed oxide containing nickel, molybdenum and tungsten, after calcination at 900° C., said calcined sample proving to be a fully cristalline mixed oxide isostructural with wolframite.

In order to estimate the crystallinity through X-ray diffraction data of the samples of mixed oxide containing nickel, molybdenum and tungsten, the collection of diffraction data must be carried out according to the following criteria:

a) use of the same diffractometer;
b) use of the same weights of the sample whose relative crystallinity is to be calculated and the same sample calcined at 900° C. (constant weight);
c) use of the same data collection conditions, for example 2-theta-step (preferably 0.03°) and accumulation time (preferably 20 seconds/step).

The procedure envisages the following phases:

a) control of the intensity of the X-ray beam and offset of the diffractometer through data collection on a standard (for example, Si (111));
b) diffraction data collection on the sample of mixed oxide isostruttural with wolframite containing nickel, molybdenum and tungsten calcined at 900° C., immediately followed by the collection of XRD data of the same sample containing nickel, molybdenum and tungsten whose relative crystallinity is to be calculated.

The calculation of the integrated intensity of the diffraction peak in the XRD pattern selected must be carried out using the same method for the sample of mixed oxide containing nickel, molybdenum and tungsten whose relative crystallinity is to be calculated and for the same sample calcined at 900° C.

The method involves fitting the profile of the XRD pattern paying particular attention to the calculation of the background.

Alternatively, the integration of the intensity of the peak can be carried out with the same angular range of 2-theta (before and after the peak) for both the mixed oxide containing nickel, molybdenum and tungsten whose relative crystallinity is to be calculated and for the same sample calcined at 900° C.

The mixed oxides OM of the present invention, and, in particular, the oxides having formula (I), (I1) and (I2), characterized in that they comprise an amorphous phase and a crystalline phase isostructural with wolframite, and having a crystallinity degree higher than 0 and lower than 100%, possibly formed without a binder, or in the shaped form with a binder, once transformed into the corresponding sulfides (I)S, (I1)S and (I2)S, they become catalysts active in hydrotreatment processes, and in particular simultaneous hydrodesulfurization, hydro denitrification and hydrodearomatization processes.

The sulfidation of the mixed oxides of the present invention and in particular compounds having formula (I), possibly formed without a binder, or in the shaped form with a binder, for obtaining the corresponding sulfide compositions which are a further object of the present invention and are active as hydrotreatment catalysts, is effected using any of the techniques and sulfiding agents known to experts in the field. In particular, the sulfidation can be carried out "ex situ" or "in situ", i.e. in the same reactor in which the hydrotreatment is subsequently effected. The sulfidation process can be carried out in a reducing atmosphere, for example consisting of $H_2S$ and hydrogen, or $CS_2$ and hydrogen, at a high temperature, for example ranging from 300° to 500° C., for a period sufficient for sulfiding the starting mixed oxide, for example from 1 to 100 hours. Alternatively, the sulfidation can also be carried out using dimethyl disulfide dissolved in a hydrocarbon charge, such as naphtha or gas oil, at a temperature ranging from 300° to 500° C. Finally, the sulfidation can be carried out directly using the sulfur present in the feedstock to be treated, preferably at a temperature ranging from 300° to 500° C.

Sulfidation techniques which can be conveniently used for transforming the mixed oxides of the present invention into the corresponding sulfides are also described, for example, in "Petroleum Refining", J. H. Gary, G. E. Handwerk, M. Dekker Ed. 1994.

The mixed oxides OM of the present invention, in particular compounds having formula (I), and therefore compounds having formula (I1) and (I2), all useful as precursors of the corresponding sulfide metallic compositions of the present invention, can be prepared simply and economically.

A further object of the present invention therefore relates to a process for preparing mixed oxides OM according to the present invention, particularly mixed oxides having formula (I), which comprises the following steps:
1) preparing a mixture in water of at least one soluble source of Ni, at least one soluble source of W and a soluble source of Mo, at least one soluble, hydrolyzable or dispersible source of at least one element Z and, as nitrogenated compound N, an amine having formula (A)

$$R^1R^2R^3N \quad (A)$$

wherein $R^1$ is a linear, branched or cyclic alkyl, containing from 4 to 12 carbon atoms, and
$R^2$ and $R^3$, equal to or different from each other, are selected from H and linear, branched or cyclic alkyl, containing from 4 to 12 carbon atoms, said alkyl possibly being equal to or different from $R^1$;
wherein the molar ratio N/(Ni+Mo+W) is greater than 0 and lower than or equal to 1, and is preferably greater than 0.1
2) subjecting the mixture to hydrothermal treatment obtaining a suspension,
3) recovering from the suspension, the solid contained therein,
4) subjecting the solid recovered in step (3) to thermal treatment at a temperature higher than or equal to 150° C. and lower than 900° C. obtaining a mixed oxide OM, containing an amorphous phase and a wolframite isostructural crystalline phase, having a crystallinity degree greater than 0 and less than 100%.

According to a preferred aspect, in step (4) a mixed oxide having formula (I) is obtained.

In step 1, the soluble source of Ni is preferably selected from the corresponding acetates, hydroxy-carbonates, carbonates, acetylacetonates, and even more preferably is nickel acetate. The soluble source of molybdenum and tungsten is preferably selected from acids, oxides and salts of ammonium. Ammonium heptamolybdate as molybdenum salt and ammonium metatungstate as tungsten salt, are preferably used.

When Z is silicon, colloidal silicas, fumed silica and tetra-alkyl orthosilicates in which the alkyl group contains from 1 to 4 carbon atoms, can be suitably used as corresponding soluble, dispersible or hydrolyzable compounds.

Hydrolyzable silicas, which, starting from monomeric precursors of silicon, guarantee a better dispersion, are preferably used. Tetraethyl orthosilicate is more preferably used.

When Z is aluminium, aluminium lactate can be suitably used as soluble compounds and, as corresponding dispersible or hydrolyzable compounds, dispersible aluminas, alumina monohydrates AlOOH, alumnina trihydrates $Al(OH)_3$, aluminium oxide, aluminium trialkoxides wherein the alkyl is linear or branched and can contain from 2 to 5 carbon atoms.

The dispersible aluminas are preferably bohemites or pseudo-bohemites characterized by particles with an average diameter of less than 100 microns. Dispersible aluminas which can be suitably used are for example bohemites of the series Versal®, Pural®, Catapal®, Disperal® and Dispal®.

Particularly preferred among dispersible aluminas are aluminas dispersible at room temperature in the presence of stirring in water or in aqueous solution containing a monovalent acid: in the dispersed phase these aluminas are nanodimensional, characterized by dimensions of the dispersed particles ranging from 10 to 500 nm. Dispersible aluminas of this type which can be suitably used are, for example, bohemites of the series Disperal® and Dispal®.

Hydrolyzable aluminas, which, starting from monomeric precursors of aluminium, guarantee a good dispersion, are preferably trialkyl aluminates in which the alkyl group contains from 3 to 4 carbon atoms. The element Z, selected from Si, Al or mixture thereof, is involved in reaction processes with the other oxidic components of the catalyst, giving rise to the formation of a mixed oxide with four metallic components.

The nitrogenated compounds having formula (A) are preferably n-hexylamine, n-heptylamine or n-octylamine.

The aqueous mixture is preferably prepared by dissolving the sources of the metals Ni, W and Mo in water, preferably in this order, and adding the source of the element Z to the solution thus obtained. The amine is then added, obtaining a suspension.

In the mixing step 1, preferably the ratios between the reagents, expressed as molar ratios, are the following:

Ni/Mo+W=0.6–1.5,

Mo/W greater than 0.1 and lower than 10
$R^1R^2R^3N/(Ni+Mo+W)$=0.1-1, more preferably 0.15-0.7
(Ni+Mo+W)/Z greater than or equal to 0.3 and lower than or equal to 10 and preferably ranging from 0.8 to 10 $H_2O/(Ni+Mo+W+Z)\geq20$, preferably ranging from 30 to 150.

The molar ratio Ni/Mo+W preferably ranges from 0.80 to 1.4, preferably from 0.95 to 1.4, even more preferably from 0.98 to 1.3.

In step (2), the resulting mixture is subjected to hydrothermal treatment, in a closed reactor, preferably at a temperature ranging from 80 to 150° C., preferably from 80 to 100° C., even more preferably at a temperature lower than or equal to that of the lowest-boiling reagent. The hydrothermal treatment is prolonged for a time preferably ranging from 5 hours to 3 days. It is preferable to operate under stirring. A peripheral rate ranging from 10 to 300 m/min is preferably used.

At the end, the suspension obtained is cooled and discharged. The solid is recovered from said suspension, in step (3): the recovery can be effected using all the solid-liquid separation techniques known to experts in the field, for example by means of filtration, flash dry, or by feeding the suspension to a spray drier.

The solid recovered consists of an amorphous matrix and some diffraction peaks of unidentified products, not attributable to the wolframite isostructural phase, may be present. These peaks are no longer present in the mixed oxides, object of the present invention obtained after thermal treatment at a temperature higher than 150° C.

The formation yield of the mixed oxide is higher than 90%, preferably higher than 95%, wherein said yield is calculated after removal of the organic component C. The yield is calculated by normalizing the weight of the mixed oxide thus obtained with respect to the theoretical weight of the oxides present in the reagent mixture, calculated considering that all the sources of Ni, Mo, W and the element Z are transformed into the corresponding oxides.

The filtration, effected according to the known techniques, can use continuous filters, such as centrifuges, or non-continuous filters such as filter presses, pressure filters, vacuum filters. Microfiltration operations can be associated to make the recovery of the salts of the transition metals present in the filtration water, quantitative. Separation by means of spray drying envisages drop atomization of the suspension which is fed through a nozzle or turbine. A hot carrier gas (generally air or nitrogen) is present in the spray chamber, which causes the evaporation of the liquid present in the drops and formation of particles which are recovered by means of a cyclone. The carrier gas can be fed in the same direction as the suspension or in countercurrent.

The temperature of the carrier gas in the inlet ranges from 200 to 700° C., preferably from 300 to 500° C.; the temperature of the carrier gas at the outlet ranges from 50 to 200° C., preferably from 100 to 160° C.

The solid obtained from step (3) can be directly subjected to thermal treatment. The thermal treatment allows to obtain the formation of the wolframite isostructural crystalline phase.

The choice of temperature at which the thermal treatment is effected allows to calibrate the crystallinity degree of the resulting mixed oxide.

In particular, thermal treatment at temperatures higher than or equal to 150° C. and lower than or equal 500° C., preferably temperatures higher than or equal to 170° C. and lower than or equal 500° C., allow to obtain a mixed oxide containing an amorphous phase and a wolframite isostructural crystalline phase, wherein said oxide has a crystallinity degree greater than 0 and lower than or equal to 70%. During the thermal treatment at a temperature higher than or equal to 150° C. and lower than or equal 500° C., preferably lower than or equal to 500° C. and higher than or equal to 170° C., the partial transformation of said nitrogenated compound N into organic residue R can also be obtained: the resulting mixed oxide will therefore have formula (I2) and a crystallinity degree greater than 0 and lower than 70%.

Thermal treatment at temperatures higher than 500° C. and lower than 900° C. allows to obtain a mixed oxide containing an amorphous phase and a wolframite isostructural crystalline phase, wherein said oxide has a crystallinity degree greater than 70 and lower than 100%.

At temperatures higher than 500° C. and lower than 900° C., the total removal is obtained of the nitrogenated compound N by decomposition: the resulting mixed oxide will therefore have formula (I1) and a crystallinity degree higher than 70% and lower than 100%.

The thermal treatments can be carried out in air, oxygen or nitrogen, for example in thermostatic chambers or muffles, with the possibility of operating with a temperature rise, and/or fluidification of the solid to be treated.

Before the sulfidation phase, the mixed oxide obtained from step (4) may require a forming phase, depending on the type of reactor in which it is used. Normally, the most widely used forming techniques without addition of a binder are pressing, binder-free extrusion, pelletization and agglomeration in spheroidal form by means of spray-drying and drop coagulation techniques. For this type of application, the most convenient technique is extrusion, either with or without a binder. This technique requires the possible addition to the material to be formed, before extrusion and to allow the drawing process of the material, of a mineral or organic acid and/or plasticizing agents and/or porogen agents and/or antifoaming agents and/or dispersing agents and/or surfactants and/or an organic binder and/or an inorganic oxide which acts as binder. These techniques are known to experts in the field and are described for example in "Extrusion in Ceramics", Handle, Frank (Eds.), Springer 2007.

Formed mixed oxides, possibly shaped with a binder, can be prepared by means of particular procedures which use the solid recovered from step (3): said solid can be subjected to extrusion in the presence of a binder before being subjected to the thermal treatment step. All binders known to experts in the field can be used, and, according to a preferred aspect, a fraction of the suspension is used as a binder, possibly concentrated, obtained from the hydrothermal step, possibly together with another binder.

In particular, formed mixed oxides according to the present invention, shaped with a binder, can be prepared as follows:

1) a mixture in water is prepared, of at least one soluble source of Ni, at least one soluble source of W and a soluble source of Mo, at least one soluble source, hydrolyzable or dispersible, of at least one element Z and, as nitrogenated compound N, an amine having formula (A)

$$R^1R^2R^3N \qquad (A)$$

wherein $R^1$ is a linear, branched or cyclic alkyl, containing from 4 to 12 carbon atoms, and $R^2$ and $R^3$, equal to or different from each other, are selected from H and linear, branched or cyclic alkyl, containing from 4 to 12 carbon atoms, said alkyl possibly being equal to or different from $R^1$;

wherein the molar ratio N/(Ni+Mo+W) is greater than 0 and lower than or equal to 1, and is preferably greater than 0.1

2) the mixture is subjected to hydrothermal treatment obtaining a suspension, 3) a soluble, hydrolyzable or dispersible precursor of an oxide MeO is added to the suspension, and possibly a mineral or organic acid, mixing, possibly in the presence of heating, for a time sufficient for obtaining a homogeneous paste having a consistency that is normally considered suitable for extrusion, 4) the product obtained from the previous step is extruded, 5) the extruded product is subjected to thermal treatment at a temperature higher than or equal to 150° C. and lower than 900° C. obtaining a mixed oxide OM, containing an amorphous phase and a wolframite isostructural crystalline phase, having a crystallinity degree greater than 0 and less than 100%, in a shaped form with a binder MeO.

According to a preferred aspect, in step (5), a mixed oxide having formula (I), formed, shaped with a binder, is obtained.

In step (5), the temperature conditions at which the thermal treatment is effected are those previously described with respect to the obtainment of mixed oxides having formula (I) without a binder, and they are selected in relation to the crystallinity degree to be obtained. In particular, thermal treatments at temperatures higher than or equal to 150° C. and lower than or equal to 500° C. allows to obtain a formed mixed oxide, shaped with a binder, containing an amorphous phase and a wolframite isostructural crystalline phase, wherein said oxide has a crystallinity degree greater than 0 and lower than or equal to 70%; thermal treatment at temperatures higher than 500° C. and lower than 900° C. allows to obtain a formed mixed oxide, shaped with a binder, containing an amorphous phase and a wolframite isostructural crystalline phase, wherein said oxide has a crystallinity degree greater than 70% and lower than 100%.

In step (3), the precursor of the oxide MeO is added in a weight ratio with the theoretical weight of the oxides of Ni, Mo and W present in the suspension ranging from 5 to 50% by weight. The acid can be added in a quantity ranging from 0.5 to 8.0 g per 100 g of oxide Meo.

Another particular object of the present invention relates to a process for preparing mixed oxides having formula (I), formed, and possibly also shaped with a binder, which comprises the following steps:

1) preparing a mixture in water of at least one soluble source of Ni, at least one soluble source of Mo and a soluble source of W, at least one soluble, hydrolyzable or dispersible source of at least one element Z and, as nitrogenated compound N, an amine having formula (A)

$$R^1R^2R^3N \quad (A)$$

wherein
$R^1$ is a linear, branched or cyclic alkyl, containing from 4 to 12 carbon atoms, and
$R^2$ and $R^3$, equal to or different from each other, are selected from H and linear, branched or cyclic alkyl, containing from 4 to 12 carbon atoms, said alkyl possibly being equal to or different from $R^1$;
wherein the molar ratio N/(Ni+Mo+W) is greater than 0 and lower than or equal to 1, and is preferably greater than 0.1

2) subjecting the mixture to hydrothermal treatment obtaining a suspension,
3) dividing the suspension into two parts (a) and (b), being the weight ratio (a)/(b) preferably ranging from 1.5 to 20,
4) recovering the solid from part (a) of the suspension, and possibly treating it at a temperature ranging from 120 to 200° C.,
5) concentrating part (b) by evaporation or filtration and mixing it with the compound recovered in step (4),
6) extruding the mixture resulting from step (5), possibly after the addition of a soluble, hydrolyzable or dispersible precursor of an oxide MeO,
7) subjecting the extruded product to thermal treatment at a temperature higher than or equal to 150° C. and lower than 900° C. obtaining a mixed oxide OM, containing an amorphous phase and a wolframite isostructural crystalline phase, having a crystallinity degree greater than 0 and less than 100%, possibly in a shaped form with the binder MeO.

According to a preferred aspect, in step (7), a mixed oxide having formula (I), formed, possibly shaped with a binder, is obtained.

In step (4), the recovery of the amorphous compound is effected with the techniques previously described, for example by means of filtration, flash dry, or by feeding the suspension to a spray drier. If the solid recovered is treated at a temperature ranging from 120 to 200° C., before being mixed with part (b) of the suspension, a partial crystallization of the wolframite isostructural phase can be obtained.

In step (6), if a soluble, hydrolyzable or dispersible precursor of an oxide Meo is added, a mineral or organic acid can also be added.

In step (7), the temperature conditions at which the thermal treatment is carried out are those previously described with respect to the production of mixed oxides having formula (I) without a binder, and they are selected in relation to the crystallinity degree to be obtained. In particular, thermal treatments at temperatures higher than or equal to 150° C. and lower than or equal to 500° C. allow to obtain a formed mixed oxide, possibly shaped with a binder, containing an amorphous phase and a wolframite isostructural crystalline phase, wherein said oxide has a crystallinity degree greater than 0 and lower than or equal to 70%;

thermal treatments at temperatures higher than 500° C. and lower than 900° C. allow to obtain a formed mixed oxide, shaped with a binder, containing an amorphous phase and a wolframite isostructural crystalline phase, wherein said oxide has a crystallinity degree greater than 70% and lower than 100%.

The fundamental aspect of this particular procedure, when effected without the addition of any oxide precursor MeO, consists in the absence of any binder that can alter the composition and physico-chemical properties of the oxide precursor, and consequently of the final catalyst.

The oxide MeO, when present, acts as binder, and is a preferred aspect that said oxide MeO be silicon oxide or aluminium oxide, and even more preferably an oxide of the same element Z present in step 1. When Me is aluminium or silicon, hydrolyzable or dispersible sources of oxide MeO which can be suitably used in this forming process are the same used for the element Z in the preparation phase of the mixed oxide. When Me is silicon, for example, colloidal silicas, fumed silica and tetra-alkyl orthosilicates in which the alkyl group contains from 1 to 4 carbon atoms, can be suitably used as corresponding soluble, dispersible or hydrolyzable compounds. When Me is aluminium, alumina monohydrates AlOOH, alumina trihydrates Al(OH)$_3$, aluminium oxide, dispersible aluminas, aluminium trialkoxides wherein the alkyl is linear or branched and can contain from 2 to 5 carbon atoms, can be suitably used.

The dispersible aluminas are preferably bohemites or pseudo-bohemites characterized by particles with an average diameter of less than 100 microns. Dispersible aluminas which can be suitably used are for example bohemites of the series Versal®, Pural®, Catapal®, Disperal® and Dispal®.

Among dispersible aluminas, aluminas dispersible at room temperature in the presence of stirring in water or in aqueous solution containing a monovalent acid, are preferably used: in the dispersed phase these aluminas are nanodimensional, characterized by dimensions of the dispersed particles ranging from 10 to 500 nm. Dispersible aluminas of this type which can be suitably used are in particular bohemites of the series Disperal® and Dispal®.

Mineral or organic acids, when used, can be:
acids already contained in the dispersible or hydrolyzable precursor of the oxide MeO, such as for example acetic acid, nitric acid,
acids added directly to the mixture to be extruded, for example acetic acid, nitric acid, phosphoric acid or boric acid.

In the extrusion step of the procedures described above, plasticizing agents can also be added, such as stearin, glycerin, polyethyleneglycol, porogen agents, such as for example, soluble starch, antifoaming agents, such as for example, silicon and non-silicon formulates, dispersing agents, such as for example, polymer dispersants for ceramic materials, surfactants, such as for example, ionic and non-ionic surface-active agents, organic ligands such as methocel.

If, when using the procedures described above, a suitable oxide precursor MeO is added, at the end of the forming process a composition containing a mixed oxide in the shaped form with a binder is obtained.

Said composition contains:
- the binder MeO, in a quantity preferably higher than 5% and lower than or equal to 50% by weight with respect to the weight of the mixed oxide, even more preferably from 5 to 30% by weight with respect to the weight of the mixed oxide, and wherein said oxide MeO is preferably aluminium oxide or silicon oxide, and even more preferably is an oxide corresponding to the element Z contained in the mixed oxide,
- a mixed oxide according to the invention, essentially having the same crystallinity, porosity, surface area and structure characteristics as the corresponding mixed oxide without a binder.

The mechanical characteristics of the extruded products thus obtained are suitable for sustaining both the sulfidation phase and thermo-mechanical stress during its use.

The catalysts of the present invention obtained by sulfidation of the mixed oxides OM, in particular oxides having formula (I), possibly formed without a binder, or mixed oxides OM, in particular mixed oxides having formula (I), in the form shaped with a binder, are extremely active catalysts and stable in hydrotreatment processes and can be suitably used in all refining processes in which hydrotreatment operations must be effected, and in particular for obtaining the hydrodesulfurization, hydrodenitrogenation and/or hydrodearomatization of a hydrocarbon mixture.

A further object of the present invention therefore relates to a process for the hydrotreatment of a feedstock containing one or more hydrocarbons which comprises putting in contact said feedstock with hydrogen and with the catalysts of the present invention obtained by sulfidation of the mixed oxides OM, in particular mixed oxides having formula (I), possibly formed.

Any feedstock or hydrocarbon mixture containing sulfur or nitrogen impurities can be treated with the catalysts of the present invention: oil distillates, oil residues, naphtha, light cycle oil, atmospheric gas oil, heavy gas oil, lube oil, paraffinic base oils, oils from naphthenic distillates, EST process products, for example, can be subjected to treatment.

EST process products refer, for example, to products obtained from the processes described in patent applications MI95A001095, MI01A001111, MI01A001438, MI02A002713, MI03A000692, MI03A000693, MI03A002207, MI04A002445, MI04A002446, MI06A001512, MI06A001511, MI07A001302, MI07A001303, MI07A001044, MI07A001045, MI07A001198, MI08A001061.

With the catalysts of the present invention, it is possible to treat hydrocarbon cuts containing up to 40,000 ppm of sulfur, possibly containing up to 2,000 ppm of nitrogen. In these cuts, up to 60% by weight of aromatic compounds and up to 30% by weight of PNA can be present.

It is preferable to operate at a temperature ranging from 100 to 450° C., preferably from 300 to 370° C., at a pressure ranging from 50 to 100 bar, preferably from 50 to 70 bar. The WHSV ranges from 0.5 to 10 hours$^{-1}$, preferably from 1 to 2 hours$^{-1}$. The quantity of hydrogen can vary from 100 to 800 times the quantity of hydrocarbons, expressed as NlH$_2$/l of hydrocarbon mixture.

According to another aspect, the sulfide catalysts of the present invention can be used for treating hydrocarbon cuts that have already undergone hydrodesulfurization and hydrodenitrogenation treatment, or cuts that by their nature have a content of S and N sufficiently low, but they are cuts with a high content of aromatic compounds and for which this content must therefore be reduced, particularly the content of polyaromatic compounds (PNA). In particular, due to their high activity in the hydrodearomatization and reduction of polycyclic aromatic compounds (PNA), the catalysts of the invention can be used in processes for the production of white oils from paraffinic base oils or from naphthene distillates. They can be particularly used for the conversion of white oils for technical use in white oils for use in food or medicines, in which the aromatic compounds must be present in a totally minimum quantity or in traces.

The same conditions used for the hydrotreatment can be adopted for the hydrodearomatization.

Due to their capacity of contemporaneously exerting a high hydrodesulfurization, hydrodenitrogenation activity and in hydrodearomatization reactions and in the reduction of aromatic polycyclic compounds (PNA), the catalysts of the invention can also be conveniently used as hydrogenating component, associated with an acid component, in hydrocracking processes. Feedstocks suitable for hydrocracking are, for example, heavy and extra-heavy crude oils, vacuum gas oil (VGO), vacuum residues (VR).

The synthesis processes of the oxide precursors of the catalysts and catalytic tests are described in the following examples, which should in no way be considered as limiting the invention itself.

EXAMPLE 1

The following products were dissolved in order in 450 g of water:
43.36 g of Ni(CH$_3$COO)$_2$.4H$_2$O,
21.58 g of (NH$_4$)6W$_{12}$O$_{41}$.H$_2$O,
15.38 g of (NH$_4$)6Mo$_7$O$_{24}$.4H$_2$O.

A solution is obtained.

After 5 minutes, 65.00 g of a dispersion of Disperal P3 previously prepared as described: 12.50 g of Disperal P3 Sasol at 67.8% of Al$_2$O$_3$ are added to 70.84 g of an aqueous solution at 0.6% by weight of acetic acid.

26.64 g of octylamine are slowly added, obtaining a suspension which is charged into an autoclave equipped with an anchor stirrer and subjected to hydrothermal treatment at 98° C. for 18 hours, at a stirring rate of 70 m/min. At the end, the autoclave is cooled and the discharged suspension is fed to the spray drier (LAB PLANT SD-04). The suspension is fed with a flow-rate of 8 l/hour. The temperature of the carrier gas (air) at the inlet is maintained at 350° C., the temperature of the carrier gas at the outlet ranges from 130 to 110° C.

A solid is obtained, which is used in the following examples.

EXAMPLE 2

A part of the solid obtained in Example 1 is calcined at 900° C. The diffraction pattern, shown in FIG. 1a, indicates the presence of wolframite and traces of alpha-NiMoO$_4$. The diffraction pattern, shown in FIG. 1a, was used for defining the 100% of crystallinity.

Said sample, used for defining the 100% of crystallinity, has an XRD pattern characterized by the signals indicated in the following table:

TABLE 1

| N° | 2θ (°) | Intensity |
|----|--------|-----------|
| 1  | 15.6   | Weak      |
| 2  | 19.3   | Strong    |
| 3  | 24.0   | Strong    |
| 4  | 24.9   | Strong    |
| 5  | 30.9   | Very Strong |
| 6  | 31.5   | Medium    |
| 7  | 36.7   | Strong    |
| 8  | 37.2   | Weak      |
| 9  | 39.2   | Medium    |
| 10 | 41.7   | Strong    |
| 11 | 46.5   | Weak      |
| 12 | 48.1   | Very Weak |
| 13 | 49.1   | Weak      |
| 14 | 52.3   | Medium    |
| 15 | 54.7   | Strong    |
| 16 | 58.8   | Very Weak |
| 17 | 62.6   | Medium    |
| 18 | 63.7   | Weak      |
| 19 | 66.0   | Strong    |
| 20 | 68.9   | Weak      |

The sample is therefore the wolframite isostructural mixed oxide containing nickel, molybdenum and tungsten used as reference for estimating the crystallinity through powder X-ray diffraction (XRD) of the samples of mixed oxide containing nickel, molybdenum and tungsten obtained in the following examples.

The solid obtained has the following molar composition $Ni_{1.0}MO_{0.5}W_{0.5}Al_{0.75}O_{5.125}$.

EXAMPLE 3

Figure 1B:
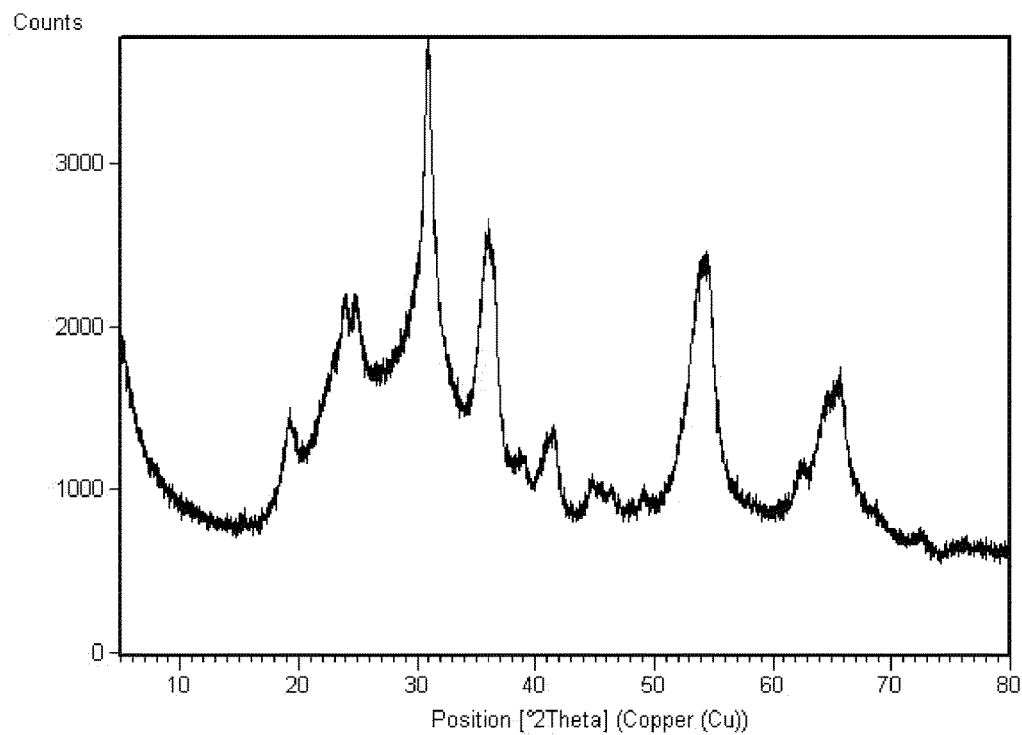

A part of the solid obtained in Example 1 is subjected to thermal treatment at 170° C. for 5 hours. The diffraction pattern, shown in FIG. 1b, indicates, in addition to the presence of the amorphous phase, the presence of wolframite having a low crystallinity.

The relative crystallinity, evaluated through powder X-ray diffraction, by means of the procedure previously described, is equal to 9%.

The organic component, calculated from the weight loss between 200 and 600° C., measured by means of TGA, is 10.3% by weight.

The solid obtained has the following molar composition $Ni_{1.0}Mo_{0.5}W_{0.5}Al_{0.75}O_{5.125}$ and contains 10.3% by weight of organic component with respect to the total weight.

EXAMPLE 4

Figure 1C:
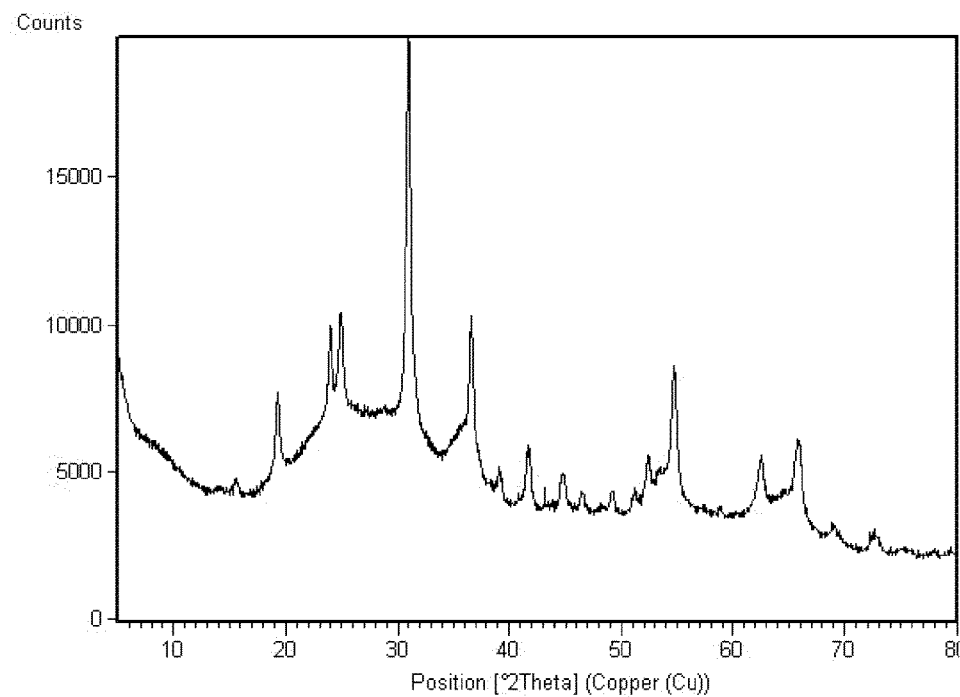

A part of the solid obtained in Example 1 is subjected to thermal treatment at 200° C. for 5 hours. The diffraction pattern, shown in FIG. 1c, indicates, in addition to the presence of the amorphous phase, the presence of wolframite and traces of α-NiMoO$_4$. The relative crystallinity, evaluated through powder X-ray diffraction, by means of the procedure previously described, is equal to 17%.

The organic component, calculated from the weight loss between 200 and 600° C., measured by means of TGA, is 7.5% by weight.

The solid obtained has the following molar composition $Ni_{1.0}Mo_{0.5}W_{0.5}Al_{0.75}O_{5.125}$ and contains 7.5% by weight of organic component with respect to the total weight.

EXAMPLE 5

Figure 1D:
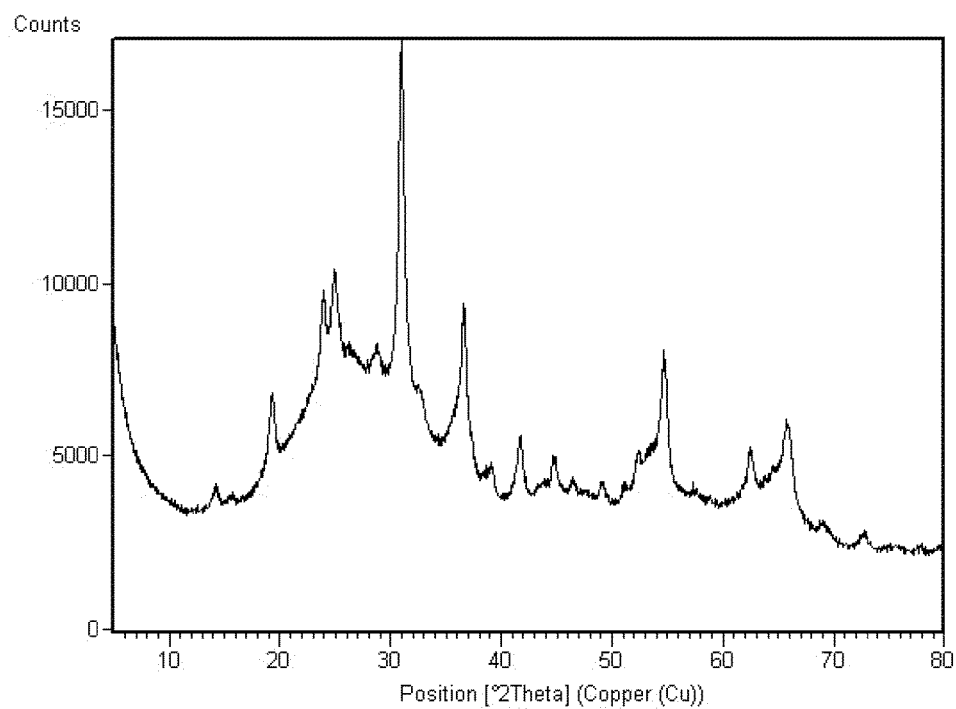

A part of the solid obtained in Example 1 is subjected to thermal treatment at 300° C. for 5 hours. The diffraction pattern, shown in FIG. 1d, indicates, in addition to the presence of the amorphous phase, the presence of wolframite and traces of α-NiMoO$_4$. The relative crystallinity, evaluated through powder X-ray diffraction, by means of the procedure previously described, is equal to 19%.

The organic component, calculated from the weight loss between 200 and 600° C., measured by means of TGA, is 5.5% by weight.

The solid obtained has the following molar composition $Ni_{1.0}Mo_{0.5}W_{0.5}Al_{0.75}O_{5.125}$ and contains 5.5% by weight of organic component with respect to the total weight.

EXAMPLE 6

Figure 1E:
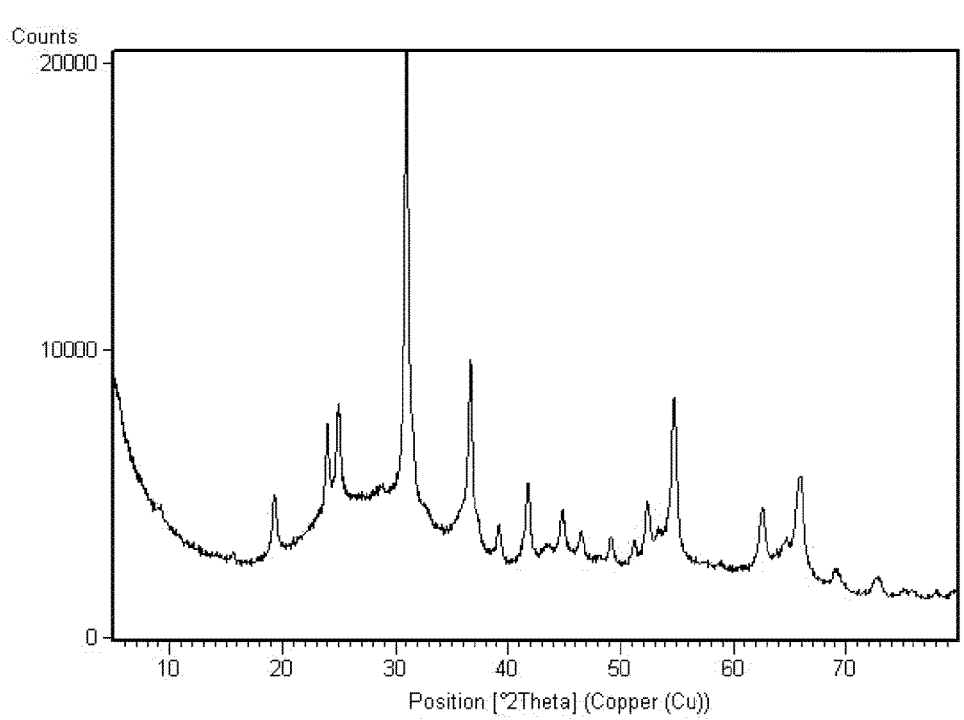

A part of the solid obtained in Example 1 is subjected to thermal treatment at 400° C. for 5 hours. The diffraction pattern, shown in FIG. 1e, indicates, in addition to the presence of the amorphous phase, the presence of wolframite and traces of α-NiMoO$_4$. The relative crystallinity, evaluated through powder X-ray diffraction, by means of the procedure previously described, is equal to 20%.

Upon analysis by means of adsorption/desorption nitrogen isotherms at 77 K, it has a surface area of 124 m$^2$/g, a pore volume of 0.28 ml/g, an average pore diameter of 5.4 nm. The organic component, calculated from the weight loss between 200 and 600° C., measured by means of TGA, is 2.3% by weight.

Figure 3:
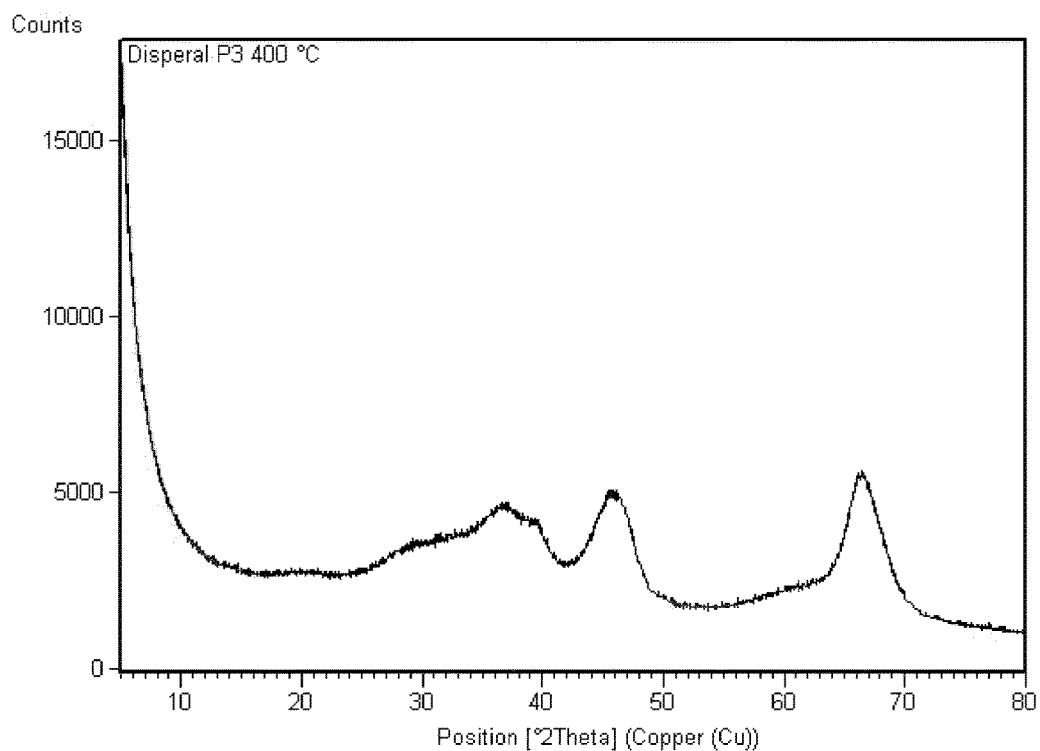
FIG. 3 illustrates the XRD diffraction pattern of the calcined sample dispersal P3.

The solid obtained has the following molar composition $Ni_{1.0}Mo_{0.5}W_{0.5}Al_{0.75}O_{5.125}$ and contains 2.3% by weight of organic component with respect to the total weight. Analyzing the diffraction pattern of FIG. 1e, it is possible to observe that there are no intense peaks at approximately 46° and 67° of 2-theta, where the most intense reflections of the gamma-alumina are located, as clearly evidenced in FIG. 3 where the XRD pattern of the sample Disperal P3 treated at 400° C. for 5 hours is reported: the XRD pattern shown in FIG. 3 of said sample of calcined Disperal P3 clearly shows that it is constituted by gamma-alumina phase.

Figure 4:
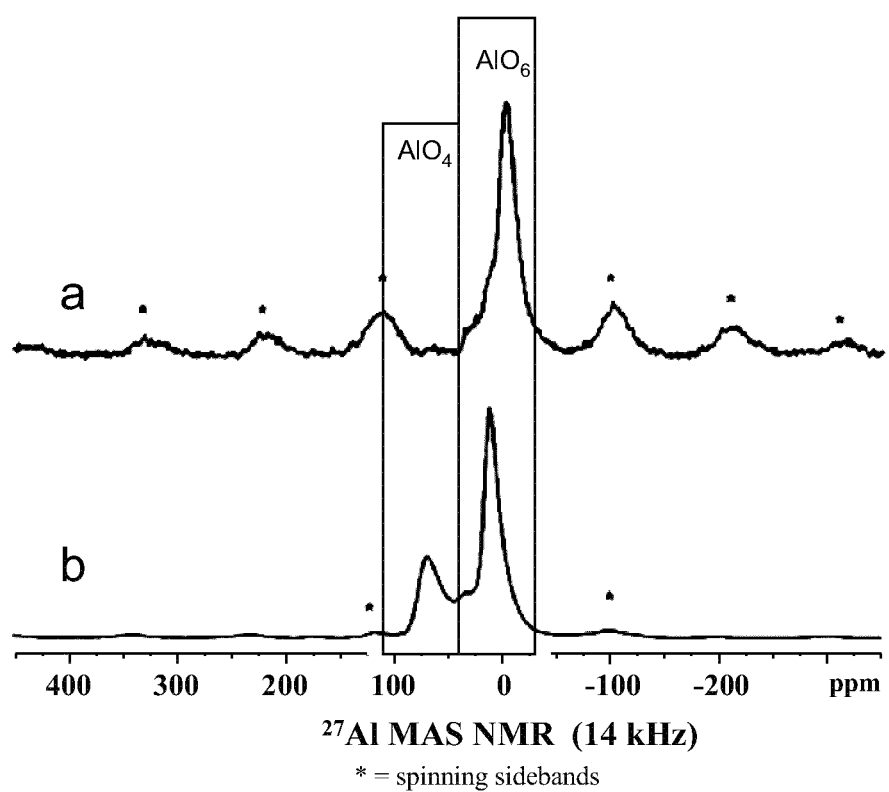
FIG. 4 illustrates the $^{27}$AL MAS NMR analysis of the sample dispersal P3.

The absence of transition phases of alumina in the sample obtained in this example is also confirmed by the $^{27}$Al MAS NMR analysis (FIG. 4, line a). The spectrum shows only the presence of a peak in the region where aluminium in octahedral coordination (AlO$_6$) is expected to resonate (maximum at −3.8 ppm), while, on the contrary, is not observed the presence of signals in the region of chemical shift where usually resonate the Al atoms in tetrahedral coordination.

In the case of gamma-alumina, obtained by thermal treatment of the sample Disperal P3 at 400° C., it is clearly evident (FIG. 4, line b) that in addition to a peak assigned to octahedral aluminium (maximum at 8.8 ppm) a peak attributed to aluminium in tetrahedral coordination (AlO$_4$) is present (maximum at 66.3 ppm).

In summary, the configuration of aluminium atoms found in the mixed oxide of the present invention thus differs from that observed in the sample of alumina thermally treated at the same temperature. The aluminium is then present in the two materials in different forms, showing that the aluminium present in the mixed oxide of the present invention, added during synthesis as Disperal P3, is involved in reaction processes with the other oxidic components of the catalyst, giving rise to the formation of a mixed oxide with four metallic components.

EXAMPLE 7

Figure 1F:
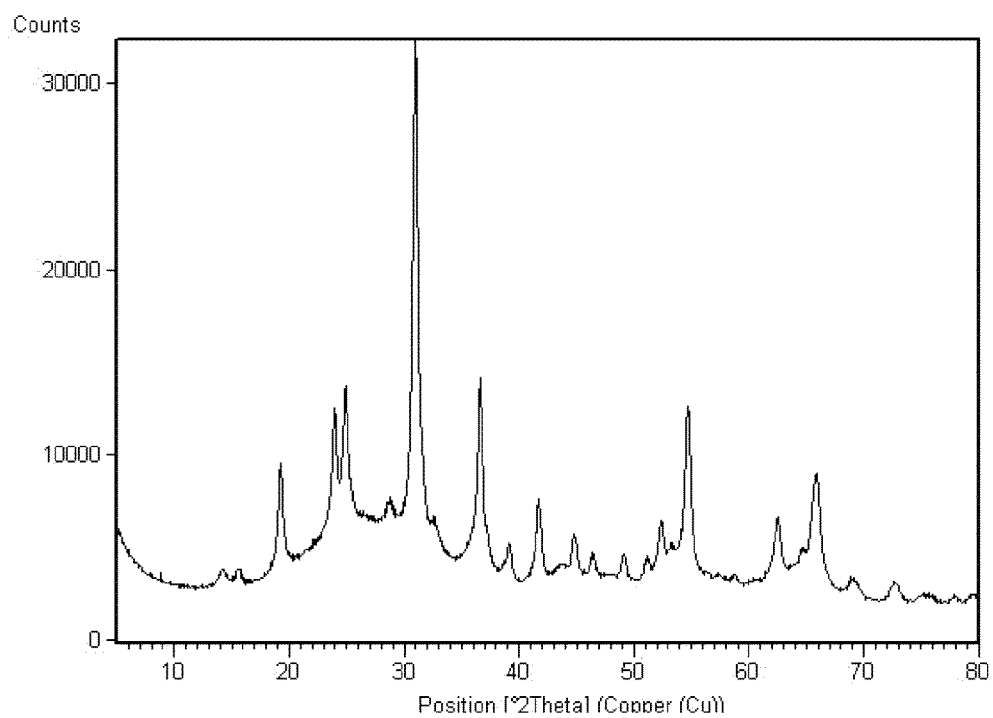

A part of the solid obtained in Example 1 is subjected to thermal treatment at 450° C. for 5 hours. The diffraction pattern, shown in FIG. 1f, indicates, in addition to the presence of amorphous, the presence of wolframite (prevalent) and α-NiMoO$_4$. The relative crystallinity, evaluated through powder X-ray diffraction, by means of the procedure previously described, is equal to 38%.

The organic component, calculated from the weight loss between 200 and 600° C., measured by means of TGA, is 0.8% by weight.

The solid obtained has the following molar composition Ni$_{1.0}$Mo$_{0.5}$W$_{0.5}$Al$_{0.75}$O$_{5.125}$ and contains 0.8% by weight of organic component with respect to the total weight.

EXAMPLE 8

Figure 1G:
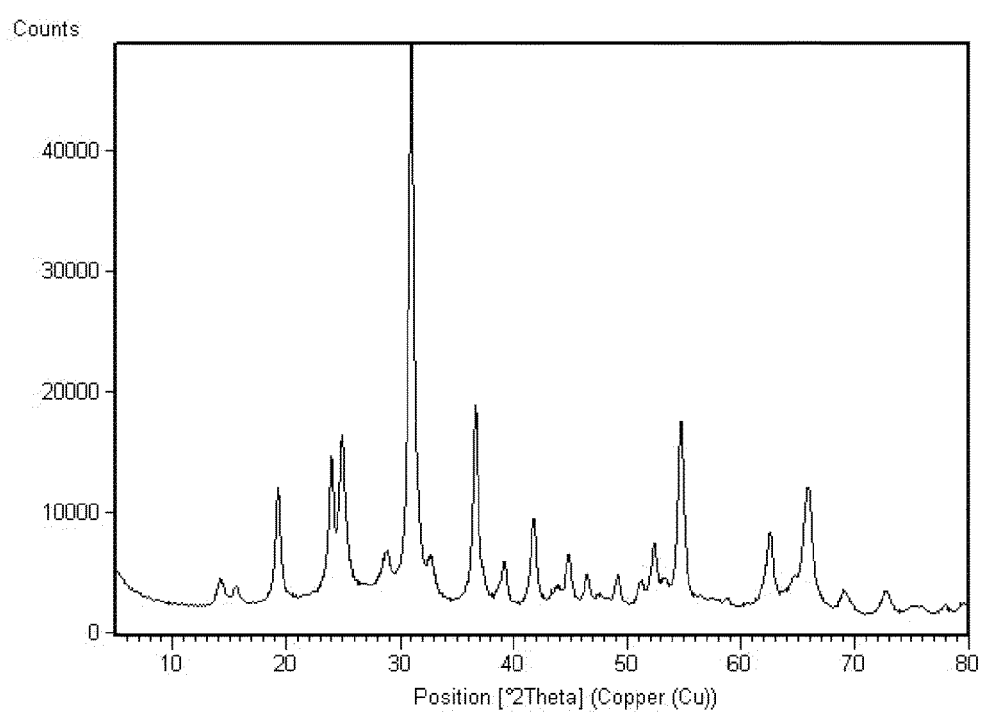

A part of the solid obtained in Example 1 is subjected to thermal treatment at 500° C. for 5 hours. The diffraction pattern, shown in FIG. 1g, indicates, in addition to the presence of amorphous, the presence of wolframite and traces of α-NiMoO$_4$. The relative crystallinity, evaluated through powder X-ray diffraction, by means of the procedure previously described, is equal to 70%.

The organic component, calculated from the weight loss between 200 and 600° C., measured by means of TGA, is 0.6% by weight.

The solid obtained has the following molar composition Ni$_{1.0}$Mo$_{0.5}$W$_{0.5}$Al$_{0.75}$O$_{5.125}$ and contains 0.6% by weight of organic component with respect to the total weight.

EXAMPLE 9 (COMPARATIVE)

The synthesis as described in Example 1 is repeated but without effecting the hydrothermal treatment. After the addition of octylamine, the suspension is left under static conditions for 20 hours at room temperature. It is then fed to the spray drier. The atomization conditions are selected so as to guarantee a temperature at the outlet of 120° C.

The solid obtained is calcined at 400° C. Upon analysis by means of adsorption/desorption nitrogen isotherms at 77 K, it has a surface area of 141 m$^2$/g, a pore volume of 0.25 ml/g, an average pore diameter of 6.0 nm.

Figure 2:
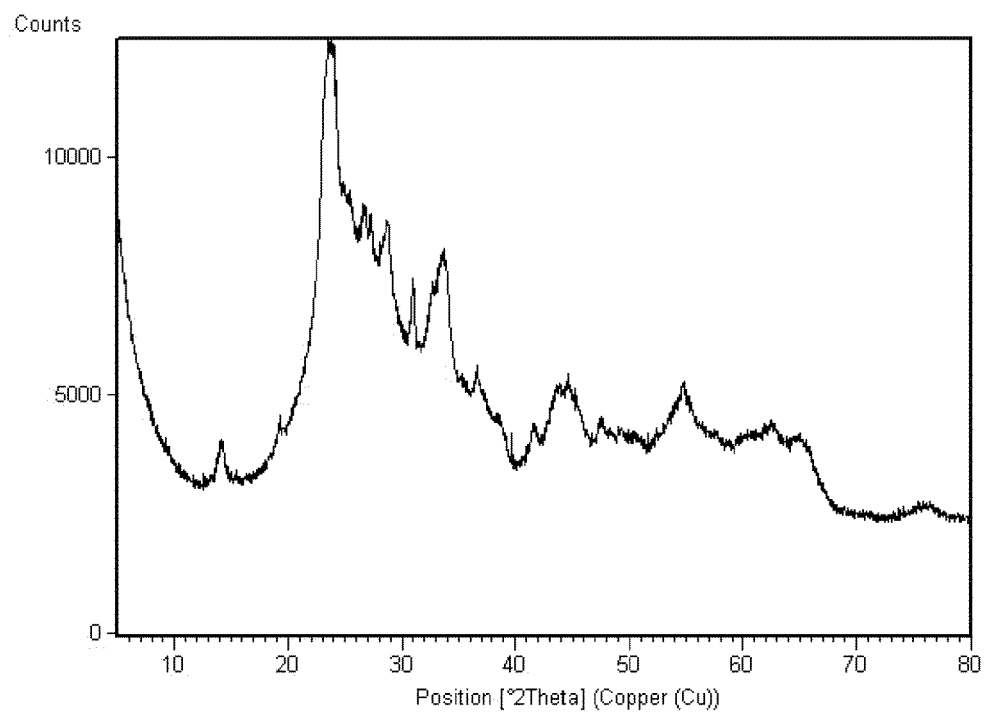
FIG. 2 illustrates the XRD diffraction pattern of comparative Example 9.

The diffraction pattern, shown in FIG. 2, reveals the presence of abundant amorphous+WO$_3$+α-NiMoO$_4$+MoO$_3$+traces of wolframite.

The hydrothermal treatment before drying with a spray drier is therefore fundamental for guaranteeing the mixed oxides according to the present invention, avoiding the preferential crystallization of α-NiMoO$_4$ and segregated Mo and W oxides.

EXAMPLE 10 (COMPARATIVE)

7.56 g of octylamine are dissolved in 40 g of absolute ethanol (solution A). A solution consisting of 14.89 g of nickel nitrate hexahydrate (NiNO), 4.52 g of ammonium heptamolybdate (EMA) and 6.98 g of ammonium metatungstate hydrate (MTA) dissolved in 50 ml of an aqueous sol containing 14.90 g of an aqueous dispersion of bohemite (Disperal® P2 of Sasol™) at 10% by weight (solution B) is then added under stirring to solution A. The molar ratio octylamine/(Ni+Mo+W) is equal to 0.6. A light green gel is formed, which is left under stirring for 3 hours, heating to 70° C. It is left to rest for 48 hours. The gel obtained does not have a supernatant and is dried in an oven at 90° C. for 48 hours. The dried material is subjected to thermal treatment at 400° C. for 5 hours in air.

The solid has the following molar composition: Ni$_{0.05}$Mo$_{0.03}$W$_{0.03}$Al$_{0.03}$O$_{0.28}$ and contains 2.0% by weight of organic residue with respect to the total weight of the solid. The specific surface area is 151 m$^2$/g, the total pore volume 0.381 cm$^3$/g, the average pore diameter 6.3 nm, calculated from the desorption isotherm.

EXAMPLE 11: CATALYTIC TEST

The hydrotreatment catalytic test was carried out as described hereunder.

The fixed bed reactor is charged with 5 grams of catalyst previously pressed and granulated (20-40 mesh).

The process takes place in 2 phases: sulfidation of the catalyst and hydrotreatment step.

a) Sulfidation

The catalyst is treated with a sulfiding mixture consisting of Straight Run Gasoil, with the addition of Dimethyldisulfide, so as to have a concentration of S equal to 2.5 by weight with respect to the total weight of the sulfiding mixture. The sulfidation conditions used are:

LHSV=3 hours$^{-1}$
P=30 bar
T=340° C.
H$_2$/sulfiding mixture=200 Nl/l.

b) Hydrotreatment

The reaction is carried out under the following conditions:
T=340° C.
P=60 bar
Liquid feedstock flow-rate: 8 ml/hour
H$_2$ flow-rate: 5 Nl/hour
WHSV=1.35 hour$^{-1}$ The feedstock stream consists of gasoil coming from thermal cracking and contains 23900 ppm of sulfur, 468 ppm of nitrogen, 37.6% by weight of total aromatics and 17% by weight of PNA.

The activity of the catalysts is evaluted after 150 hours of test at 340° C. and is expressed as hydrodenitrogenation (HDN), hydrodesulfurization (HDS), hydrodearomatization (HDA) conversion and as PNA conversion.

The catalyst of comparative Example 10 was subjected to the catalytic test. For this catalyst, the hydrodenitrogenation (HDN), hydrodesulfurization (HDS), hydrodearomatization (HDA) conversion and reduction of PNA are defined as being equal to 100.

EXAMPLE 12

The sample of Example 3 was subjected to the catalytic test as described in Example 11. The results obtained are normalized with respect to those obtained with the catalyst of comparative Example 10.

The data are indicated in the following table:

| Example | Catalyst | HDN | HDS | HDA | PNA |
|---|---|---|---|---|---|
| 11 | Comparative Ex. 10 | 100 | 100 | 100 | 100 |
| 12 | Example 3 | 101 | 102 | 231 | 104 |

As can be observed from the data indicated above, the mixed oxides of the present invention characterized in that they comprise an amorphous phase and a wolframite isostructural crystalline phase, having a crystallinity degree higher than 0 and lower than 100%, allow to obtain better performances for all the conversion parameters considered, with respect to the comparative material, representative of the prior art. In particular, they are more active in the hydrodearomatization activity and reduction of PNA.

EXAMPLE 13

The sample of comparative Example 9 was subjected to the catalytic test as described in Example 11. The results obtained are normalized with respect to those obtained with the catalyst of comparative Example 10.

The catalyst 9 has a reduction in the hydrodenitrogenation conversion ($C_{HDN}$ 96%) and hydrodesulfurization conversion ($C_{HDS}$=98%) with respect to the comparative catalyst 10, and therefore also with respect to the catalyst of Example 3, representative of the invention.

As can be observed from the data indicated, the samples in which the mixed oxide tends to form different crystalline phases (e.g. $WO_3$+alfa-$NiMoO_4$+$MoO_3$), are less active with respect to the mixed oxides of the present invention, characterized in that they comprise an amorphous phase and a wolframite isostructural crystalline phase, having a crystallinity degree higher than 0 and lower than 100%.

The invention claimed is:
1. A process for preparing mixed oxides comprising the following steps:
  1) preparing a mixture in water of at least one soluble source of Ni, at least one soluble source of W and a soluble source of Mo, at least one soluble, hydrolyzable or dispersible source of at least one element Z and, as nitrogenated compound N, an amine having formula (A)

$$R^1R^2R^3N \quad (A)$$

wherein
  $R^1$ is a linear, branched or cyclic alkyl, containing from 4 to 12 carbon atoms, and
  $R^2$ and $R^3$, equal to or different from each other, are selected from H and linear, branched or cyclic alkyl, containing from 4 to 12 carbon atoms, said alkyl possibly being equal to or different from $R^1$;
  Z is Si, Al, or a mixture thereof;
  wherein the molar ratio N/(Ni+Mo+W) is greater than 0 and lower than or equal to 1
  2) subjecting the mixture to hydrothermal treatment obtaining a suspension,
  3) recovering from the suspension, the solid contained therein,
  4) subjecting the solid recovered in step (3) to thermal treatment at a temperature higher than 150° C. and lower than 900° C. obtaining a mixed oxide MO, containing an amorphous phase and a wolframite isostructural crystalline phase, having a crystallinity degree greater than 0 and less than 100%.

2. The process according to claim 1, wherein, in step (1), the ratios between the reagents, expressed as molar ratios, are the following:
Ni/Mo+W=0.6-1.5,
Mo/W greater than 0.1 and lower than 10,
$R^1R^2R^3$N/(Ni+Mo+W)=0.1-1,
(Ni+Mo+W)/Z greater than or equal to 0.3 and lower than or equal to 10, $H_2O$/(Ni+Mo+W+Z)≥20.

3. The process according to claim 1, wherein, in step (2), the mixture is subjected to hydrothermal treatment, in a closed reactor, at a temperature ranging from 80 to 150° C.

4. The process according to claim 3, wherein the hydrothermal treatment is carried out at a temperature lower than or equal to that of the lowest-boiling reagent.

5. The process according to claim 1, wherein the thermal treatment of step (4) is carried out at a temperature higher than or equal to 150° C. and lower than or equal to 500° C.

6. The process according to claim 1, wherein the thermal treatment of step (4) is carried out at a temperature higher than 500° C. and lower than 900° C.

7. The process according to claim 2, wherein the thermal treatment of step (4) is carried out at a temperature higher than 500° C. and lower than 900° C.

8. A process for preparing a mixed oxide, formed, shaped with a binder, comprising the following steps:
  1) preparing a mixture in water of at least one soluble source of Ni, at least one soluble source of Mo and a soluble source of W, at least one soluble, hydrolyzable or dispersible source of at least one element Z and, as nitrogenated compound N, an amine having formula (A)

$$R^1R^2R^3N \quad (A)$$

wherein
  $R^1$ is a linear, branched or cyclic alkyl, containing from 4 to 12 carbon atoms, and
  $R^2$ and $R^3$, equal to or different from each other, are selected from H and linear, branched or cyclic alkyl, containing from 4 to 12 carbon atoms, said alkyl possibly being equal to or different from $R^1$;
  Z is Si, Al, or a mixture thereof;
  wherein the molar ratio N/(Ni+Mo+W) is greater than 0 and lower than or equal to 1,
  2) subjecting the mixture to hydrothermal treatment obtaining a suspension,
  3) adding to the suspension, a soluble, hydrolyzable or dispersible precursor of an oxide MeO, wherein Me is Si or Al, independently from Z, and possibly adding a mineral or organic acid, mixing, possibly in the presence of heating, for a time sufficient for obtaining a homogeneous paste having a consistency suitable for extrusion,
  4) extruding the product obtained from the previous step,
  5) subjecting the extruded product to thermal treatment at a temperature higher than or equal to 150° C. and lower than 900° C. obtaining a mixed oxide MO, containing an amorphous phase and a wolframite isostructural crystalline phase, having a crystallinity degree greater than 0 and less than 100%, in a shaped form with a binder MeO.

* * * * *